March 31, 1936.  A. C. McWILLIAMS  2,035,974
THERMAL DRAFT REGULATOR
Filed Aug. 4, 1934  3 Sheets-Sheet 1
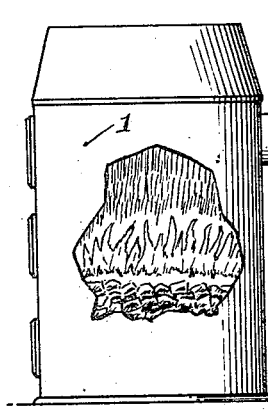
Fig.1.
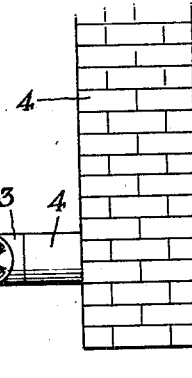
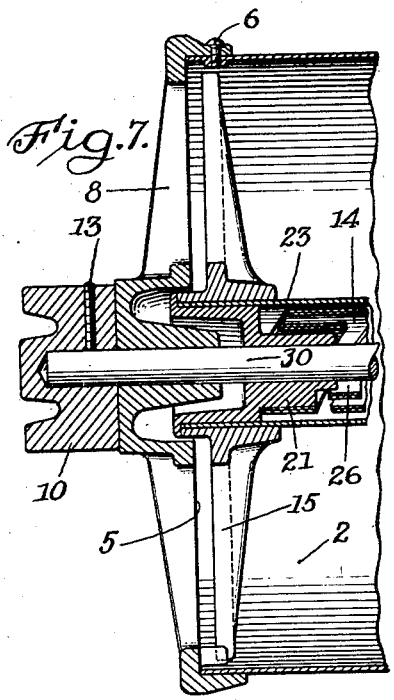
Fig.7.
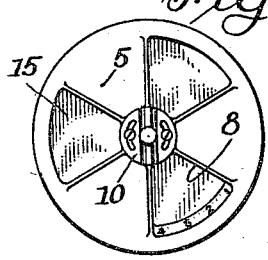
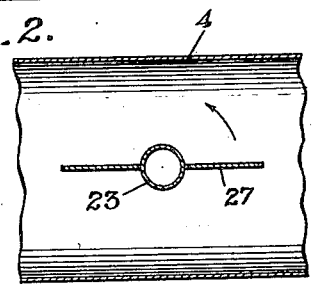
Fig.2.
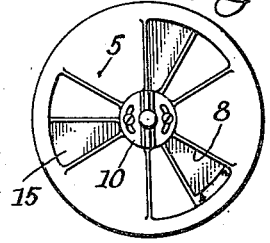
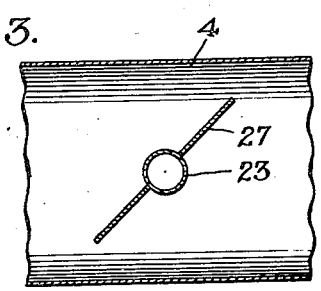
Fig.3.
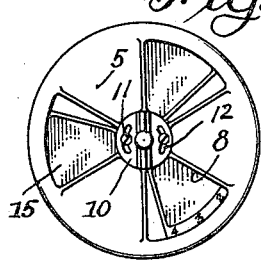
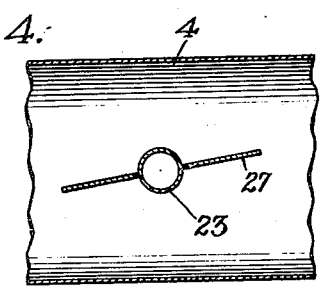
Fig.4.
INVENTOR:
Arthur C. McWilliams
BY
Albert Scheible
ATTORNEY

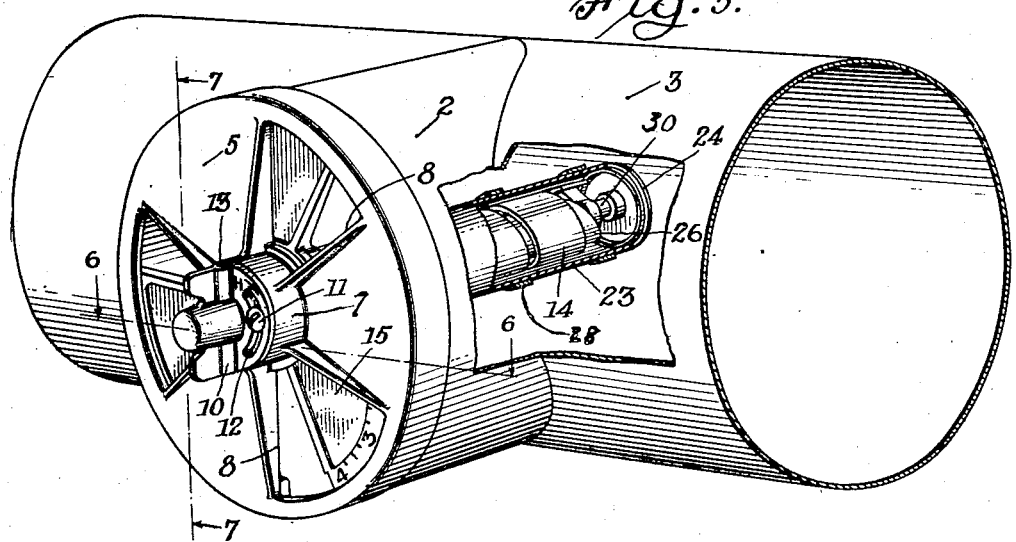
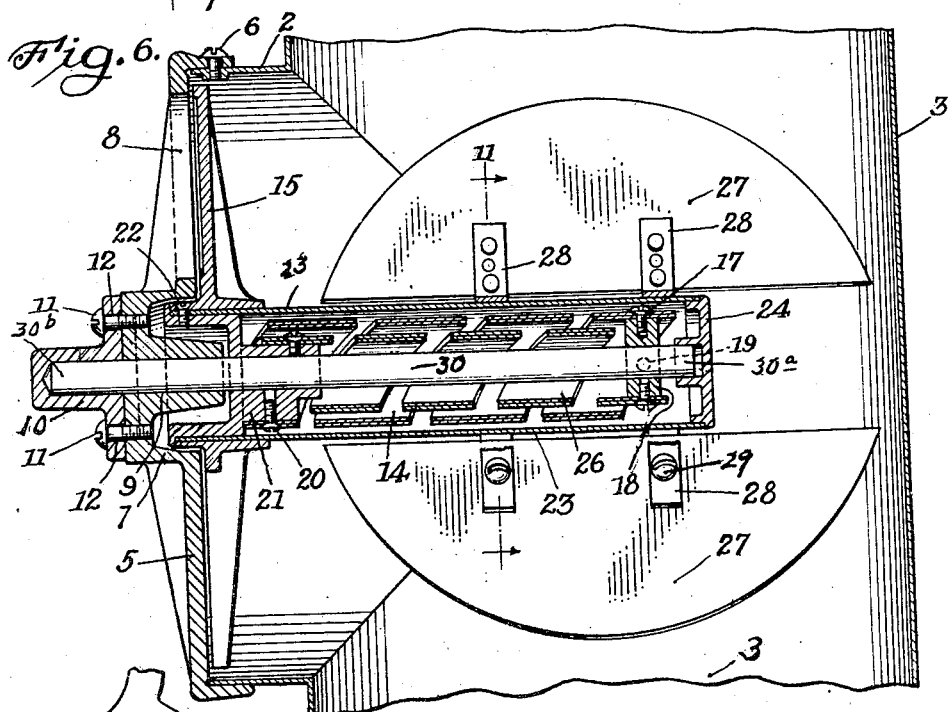
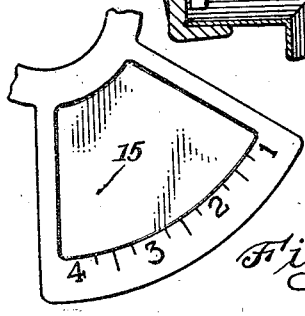

March 31, 1936.  A. C. McWILLIAMS  2,035,974
THERMAL DRAFT REGULATOR
Filed Aug. 4, 1934  3 Sheets-Sheet 3
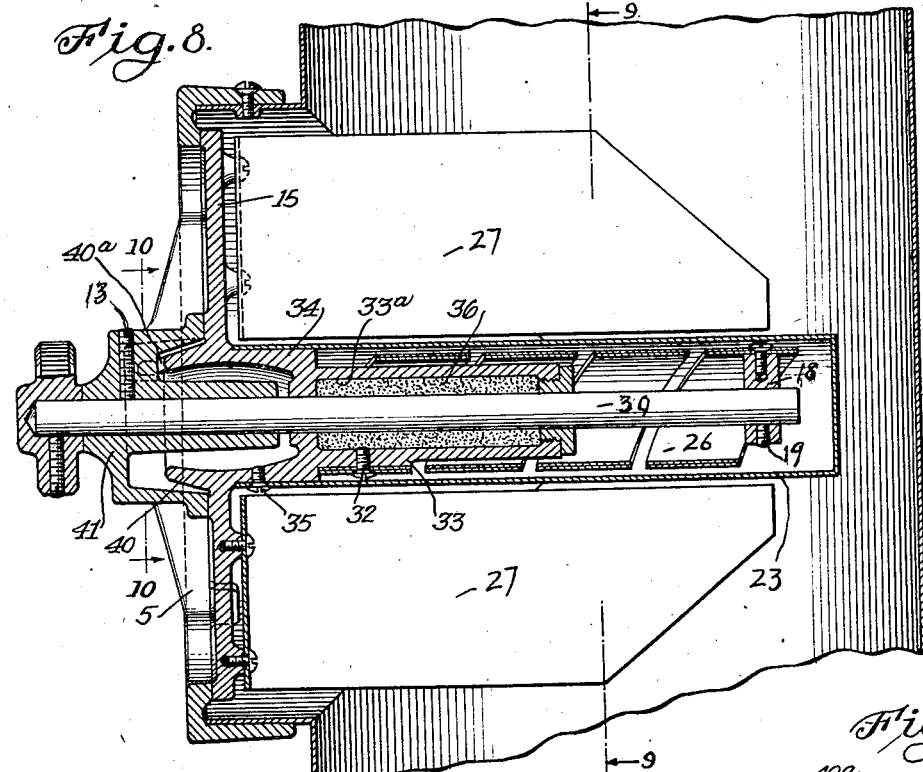
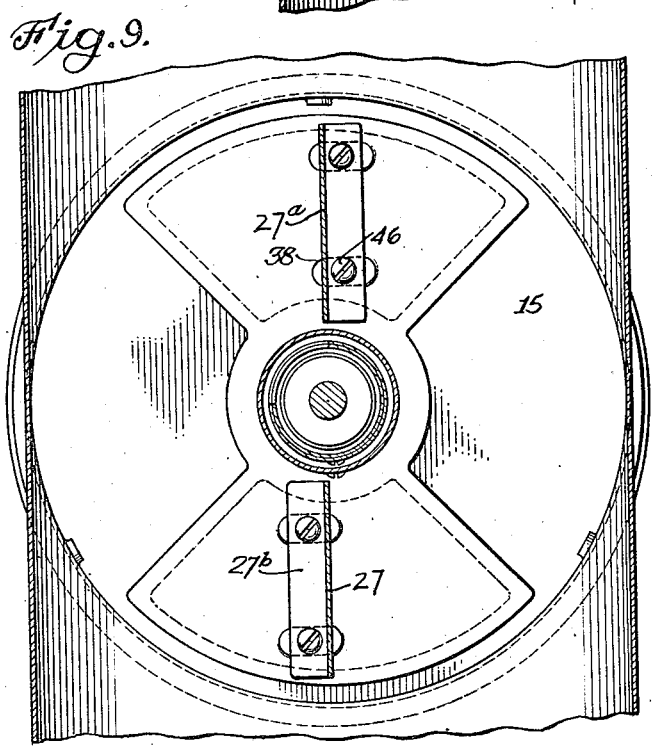
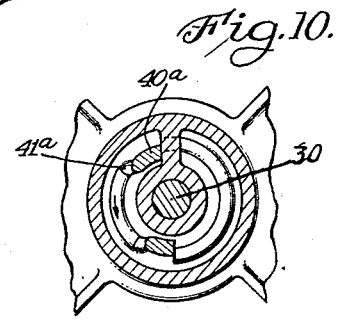
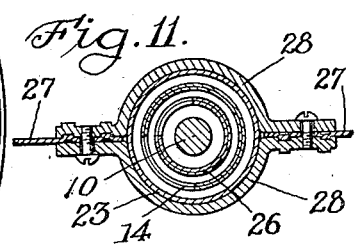
INVENTOR:
Arthur C. McWilliams
BY
Albert Scheible
ATTORNEY Patented Mar. 31, 1936

2,035,974

UNITED STATES PATENT OFFICE 2,035,974

THERMAL DRAFT REGULATOR

Arthur C. McWilliams, Chicago, Ill.

Application August 4, 1934, Serial No. 738,414

17 Claims. (Cl. 236—93)

My invention relates to means for controlling the draft through a flue pipe leading from a heater, and in one of its major objects aims to provide an entirely automatic flue-draft regulator which will greatly reduce the loss of heat up the chimney and correspondingly reduce the needed amount of fuel for the heater; and which will improve combustion by raising the percentage of $CO_2$ in the waste gases, prevent an overheating of the heater and the chimney, and lessen the possibility of having the fire go out because of insufficient draft.

In another major object, my invention aims to provide a simple, durable, inexpensive regulator which will automatically control the effective suction in a flue pipe by reducing the area available for the free passage of combustion gases, which conjointly therewith will also control the chimney draft by admitting draft-checking air to the chimney through a variable opening in the flue pipe, and in which the said conjoint control will be responsive to the combustion requirements within the heater.

Furthermore, my invention aims to provide an automatic flue-draft regulator which will be adequately responsive to the combustion requirements of the fire in the heater, but not over-sensitive, which can readily be adjusted according to the nature of the fuel and according to the chimney suction; which will not jam or clog or cause the emission of smoke and gases into the house under usual operating conditions, and which ordinarily require no attention or re-adjustment.

In addition, my invention aims to provide flue-draft regulator of the above recited characteristics, in which the means for automatically controlling the admission of draft-checking air will also actuate a flue damper so as to vary the effective area of a part of the flue-pipe through which the combustion gases pass, thereby adapting my regulator for efficient use with heaters in which oil or coke is used as the fuel, or with coal-burning heaters when connected to a chimney which has an exceptionally high draft.

Heretofore, automatic chimney-draft dampers have been of two general types, one being a suction type in which a damper is urged by gravity to its closure position and is moved by the chimney suction for admitting air to the chimney (either directly or through the flue-pipe). Such a suction type regulator responds only to the velocity of the combustion gases regardless of the varying requirements of draft through the fire-box of the heater, so that such a control device often allows the combustion gases to pass so rapidly to the chimney that the excess of cold air passing through the fuel bed (or past the oil burner) will reduce the temperature in the furnace, thereby causing inefficient combustion and a corresponding waste of fuel.

Or, if the barometer is high, while the heater is relatively cold, the checked draft may not draw sufficient air through a thick bed of coke to maintain the combustion, so that the fire will go out. On the other hand, the heat of the combustion gases passing up the chimney from a hot and roaring fire may easily overheat the flue-pipe and the chimney even when the chimney draft is insufficient for opening the damper to a material extent, thereby increasing the waste of heat of the chimney and sometimes even setting the house on fire. My present invention aims to check this waste of heat by having the regulator control both the suction up the chimney conjointly with its control of the rate of combustion of the fuel.

In practice, automatic dampers of this suction type also are sluggish in action, require frequent re-adjusting, are apt to have soot interfere with their action, and also are apt to flap back and forth noisily in response to sudden changes in wind velocity, all of which objections my present invention also aims to avoid.

In one widely used type of thermostatic regulator, both the air admitted to the fire-box and the draft through the flue-pipe are controlled by a thermostat in a room distant from the furnace. Such regulators are commonly constructed so as to turn the draft either entirely on or entirely off, but not to adjust the draft to any intermediate extent; and since such a draft control takes no cognizance of the rate of combustion in the furnace, both the furnace and the flue-pipe may overheat before a change in the distant room temperature actuates the regulator again. My present invention aims to avoid the just recited objections by making the control responsive to the temperature within the flue-pipe, rather than in some distant room; also, by arranging the regulator so that it will operate gradually in both directions and so that it will check both the rate of fuel combustion and the escape of heat up the chimney in direct proportion to the temperature of the flue gases.

Thermostatic flue-draft regulators also have heretofore been constructed for actuating a damper in the flue-pipe directly by a thermostatic element disposed within this pipe. But these have commonly had the objections that it is difficult to secure an adequate damper-actuating power from a thermostatic element small enough to be disposed within the flue-pipe, particularly when soot causes the damper to stick; also, that an exposure of a thermostatic element to the hot flue gases causes rapid deterioration of this element and that a direct exposure of a thermostatic element to the hot flue gases makes it respond too rapidly to a rise in temperature.

More particularly, my present invention aims to overcome the above recited objections to the suction-type (or barometrically responsive) flue draft regulators by providing a thermally responsive regulator which will conjointly control the admission of draft-checking air to the flue pipe and the effective gas passage area of this pipe, and by providing simple means whereby these two controls can readily be adjusted both to the nature of the fuel (and to other peculiarities of the heater) and to the normal draft of the chimney.

Furthermore, my invention provides simple means for increasing the power of thermostatic damper-actuating elements by conjointly utilizing a plurality of such elements, and overcomes the objections of unduly rapid responsiveness by encasing these in a metal housing which also shield these elements from the flue gases and from soot. In addition, my invention provides a control mechanism which will afford adequate lubrication for moving parts, and which can readily be attached to flue pipes of widely varying sizes and shapes.

Illustrative of my invention,

Fig. 1 is an elevation showing my draft-controller as mounted in a flue-pipe leading from a heater to a chimney, with a portion of the heater broken away and with the check-draft damper in a position corresponding to the condition of the fire.

Figs. 2, 3 and 4 are views showing three corresponding positions of the check-draft damper and of the flue-throttling damper.

Fig. 5 is an enlarged and fragmentary perspective view of the same damper and its mounting, with both of the dampers partly open, and including two coiled bimetallic strips.

Fig. 6 is an enlarged section taken axially of the check-draft damper and approximately in the plane of the flue-throttling damper when both dampers are in their closed positions.

Fig. 7 is a section similar to the left-hand portion of Fig. 6, showing the check-draft damper in its full-open position.

Fig. 8 is a section allied to Fig. 6, showing an embodiment of my invention employing a single bimetallic coil and differing in other structural features from that of Fig. 6.

Fig. 9 is a section taken along the line 9—9 of Fig. 8.

Fig. 10 is a section taken along the line 10—10 of Fig. 8.

Fig. 11 is a section taken along the line 11—11 of Fig. 6.

Fig. 12 is an enlarged front elevation of a portion of the check-draft damper shown in Figs. 1 to 5.

For controlling a household type of heater, such as a hot air furnace 1 of Fig. 1, I preferably mount my dual control appliance on the stem 2 (Fig. 5) of a sheet metal pipe T forming part of the flue pipe 3 leading from the heater to the chimney 4, thereby simplifying the installation. Then I support all other parts of my appliance from a cover-like casting 5 which fits over the free end of the said tubular stem and is detachably fastened to that stem by screws 6 as shown in Fig. 6. This cover includes an outwardly directed central hub 7, while the part of the cover radially outward of this hub is generally flat and is provided with sectoral air-admitting apertures 8.

Extending through an axial bore 9 (Fig. 6) in this cover is a shaft 30 which extends also into an axial bore in a cap 10 fastened to the hub 7 by screws 11 parallel to the shaft. Each of these screws extends through an arcuate slot 12 (Fig. 5) in the cap, thereby permitting a rotational adjustment of the cap with respect to the cover when these screws are loosened, and shaft is anchored to the cap by a screw 13 (Fig. 8) threaded radially through the cap.

Rotatable with respect to the shaft and connected to the shaft 30 by a spirally coiled bimetallic (and hence thermally responsive) element 14 is a check-draft damper 15 which has vanes respectively adapted to close the several apertures 8 in the pipe inlet cover or stationary plate 5. The connection of the shaft to the end of the coil which is farthest from the said plate 5 is desirably made by a screw 17 which clamps the inward end of the coil to a sleeve 18 slipped over the shaft and fastened to the latter by another screw 19.

The other end of the coil, according to Fig. 6, is similarly clamped by a screw 20 to a damper hub 21 which in this case is separately formed from the main portion of the damper and which is free to rotate and slide on the shaft. The hub 21 is fastened to the main portion of the damper by a screw 22 which screw extends also through a metal tube 23 freely housing the bimetallic coil, this tube being closed at its inner end by a cap 35 which has its central portion bored out to form a guide bore 25 rotatably and slidably fitting the inner end of the shaft.

The thermally responsive element 14 is formed from a bimetallic strip consisting of two superposed welded metal strips of different coefficients of expansion, and the coiling is such that the metal which has the higher coefficient of expansion is on the outside of the coil. Consequently, a rise in temperature will contract the diameter of the coil as well as shorten the length of the coil, thereby rotating the outward end of the bimetallic coil along with the damper 15; while a decrease in temperature will rotate the damper in the opposite direction. The coil when cold acts as a spring for pressing the damper plate 15 against imperforate portions of that plate (or a little farther to the left than shown in Fig. 6) so as to effect an adequate closure.

Then when the temperature within the flue-pipe rises so as to contract the coil in length, this coil not only rotates the check-draft damper 15 but also moves the latter (axially of the shaft 30) away from the stationary air-admitting plate 8, as shown in Fig. 7. This positive movement of the check-draft damper away from the air-admitting plate 8 pulls this damper off any soot which otherwise might cause the damper to stick, so that the damper rotates in prompt response to the action of the bimetallic strips.

To secure adequate power within a compact space, I desirably also supplement the bimetallic spiral coil 14 by a second and similarly spiralled coil 26, which second coil likewise has its ends fastened respectively to the sleeve 18 which is fast on the shaft and to the damper hub 21 through which the shaft extends with freedom for both rotation and sliding.

To conserve heat and save fuel in cases of strong draft suction, such as may be due either to the high fire-box temperature when oil or coke is the fuel, or to an exceptionally high chimney draft with coal as the fuel, I may also provide a second damper rotating conjointly with the check-draft damper and disposed for varying the effective passage area of the flue-pipe. In Figs. 5 and 6 this auxiliary flue-throttling damper consists of two sheet metal segments 27, supported in a common plane diametric of the shaft 30 by clamps 28 which extend around the coil-housing tube 23, so that this damper can be adjusted rotationally of the said tube when the clamping screws 29 are temporarily loosened.

When this adjustment is made so that the vanes 27 of the flue-throttling damper extend along the axis of the flue-pipe 4 when the check-draft damper is closed, the flue-pipe damper 27 will be wide open and the check-draft damper will be closed when the flue-pipe is relatively cool, as shown for both of these dampers in Fig. 2. As the flue-pipe warms up, the bimetallic member gradually rotates both of the dampers conjointly, so that the rise in the flue-pipe temperature due to a normal fire in the heater may bring these dampers to positions such as those shown in Fig. 3, namely with both dampers approximately half open. An abnormally high flue-pipe temperature obviously will open the check-draft damper 15 more widely and move the flue-pipe damper 27 to a position in which the latter effects a further reduction of the area through which the combustion gases flow to the chimney, so that my regulator automatically prevents the large waste of heat (up the chimney) due to socalled "runaway fires".

So also, when the screws 6 in Fig. 7 are temporarily detached, the user can bodily detach the entire regulator from the flue-pipe 7, and then (after loosening the clamping screws 29 of Fig. 6) can rotate the flue-pipe damper so as to vary the angle at which the vanes 27 of this damper are disposed with respect to a given plane diametric of the perforated cover plate 5, thereby adjusting this flue-pipe damper to the normal draft of the chimney.

During the above described adjustments, the bimetallic coil (or each such coil when two are employed, as in Fig. 6, to increase the rotating power so as to prevent dirt or the like from causing the damper vanes 15 to stick to the perforated cover plate 5) remains continuously housed by the metal tube 23 which has its opposite ends effectively closed respectively by the end cap 24 and the tubular member 21. Consequently, no thermostatic coil is corroded or otherwise affected by soot, dust or the like. Moreover, the air which spaces each such coil from the said tube 23 conducts heat rather slowly, so that the resulting lag in temperature changes prevents the bimetallic coil from responding too rapidly to temperature changes.

Moreover, by leaving the inward end of the shaft 30 of my regulator freely spaced from the adjacent portion of the end cap 24, as well as freely rotatable in this cap, and by having the outward end of this shaft abut against a part of the outer end cap 10 (as shown for both of these shaft ends in Fig. 6) I also utilize the shortening of each bimetallic coil during its rise in temperature for drawing the check-draft damper 15 inwardly away from the perforated cover plate 5, thereby positively loosening this damper in case any sticky material collects between the damper and the cover plate.

In practice, I have found that my above described regulator will continuously and automatically regulate the fire of a heater when the fuel is either coal, coke or oil; and I have also found that even with coke as the fuel, this regulator will neither let the fire run away nor allow the fire to die out.

In addition, I have found that by using a flue-pipe damper conjointly with a check-draft damper, I effect a decidedly increased saving of fuel for this reason: The flue-pipe damper, when moved toward its maximum flue-throttling position, holds the heat in the fire-box so that the temperature within this fire-box is increased and the draft of cold air through the bed of fuel is decreased. As the result of these combined actions, I secure a greatly improved combustion of the fuel, as attested by the increase of carbon dioxide and decrease of carbon monoxide in the chimney—as for example, an increase of the carbon dioxide from six percent to eight or even ten percent.

This improved combustion cooperates in the saving of fuel with the decided reduction in the proportion of heat which is wasted up the chimney, which saving I have checked by flue-pipe temperature measurements showing about 600 degrees on the flue-pipe at the furnace side of my regulator, as against about 140 degrees on the opposite side. Consequently, with an oil-burning furnace I have found the installing of my regulator in the flue-pipe to reduce the needed amount of fuel by as much as about one-third in severe winter weather.

Moreover, I have found that my regulator is not affected by the depth of a fuel bed or by the action of a strong chimney draft caused by low temperatures or high winds, and that it effectively responds only by the temperature within the flue pipe. By thus obtaining an entirely automatic control, I lessen the labor required in attending the furnace or other heater, as it does not have to be watched carefully, and as the result of the fuel saving and of the improved combustion, also obtain cleaner ashes and less of them, so that much less shaking of the grate is required when a hard fuel is used.

However, while I have heretofore described embodiments of my automatic regulator as including numerous desirable details of construction and arrangement, I do not wish to be limited in these respects, since many changes could obviously be made without departing either from the spirit of my invention or from the appended claims.

In the embodiment of Figs. 8, 9 and 10, I am showing my draft regulator as constructed with a single bimetallic coil, which may be ample for use with relatively small flue-pipes where the general dimensions of my draft regulator can be reduced correspondingly, and where the power of a single thermostatic coil would be ample. In this case, the bimetallic coil 26 is fastened at its inner end to the shaft 30 in the same manner as in Fig. 6, while the more outward end of this coil is fastened by a screw 32 to a hollow extension 33 of a hub 34 over which the outward end of the coil-housing tube 23 is telescoped, and to which hub the said tube is fastened by a screw 35.

This hub 34 is integral with the apertured damper plate 15 and has the interior 33a of its hollow extension 33 filled with graphite 36 for lubricating the shaft 30. Also, the damper vanes 27a are fastened directly to the said plane 5 by screws 46, each of which screws extends (through a slot 38 in a foot flange 27b of a vane) into the stationary cover plate 5, so that the positions of the vanes can be adjusted when these screws are temporarily loosened.

In this case the hub 34 on the damper plate also has a tubular outward extension 40 housed by a cap member 41, the last named two elements having interengageable portions 40a and 41a adapted to limit their relative rotational movement.

I claim as my invention:

1. An automatic regulator for controlling the operation of a heater connected to a flue-pipe which is provided with an opening for admitting draft-checking air, comprising a check-draft damper controlling the said opening; a flue-pipe damper for varying the effective gas-passage area of the said pipe; a thermally responsive member supported within the said pipe; and connecting instrumentalities whereby a movement of the said member in response to temperature changes conjointly moves the two dampers; the regulator including a metallic casing freely housing the thermally responsive member and affording an air chamber, whereby the sluggish conduction of heat through the air from the said casing to the said member causes the latter to lag behind the said casing in temperature changes.

2. An automatic regulator for controlling the operation of a heater connected to a flue-pipe which is provided with an opening for admitting draft-checking air, comprising a check-draft damper controlling the said opening; a flue-pipe damper for varying the effective gas-passage area of the said pipe; a thermally responsive member supported within the said pipe; and connecting instrumentalities whereby a movement of the said member in response to temperature changes conjointly moves the two dampers; the regulator including a metallic casing freely housing the thermally responsive member and affording an air chamber, the thermally responsive member being a bimetallic coil and the casing including a metal tube coaxial with the coil and spaced from the latter by a distance which is a minor fraction of the radius of the coil.

3. An automatic regulator for controlling the operation of a heater connected to a flue-pipe which is provided with an opening for admitting draft-checking air, comprising a stationary plate spanning the said opening and provided with apertures, a shaft rigidly supported by the said plate and extending into the flue-pipe radially of the latter, a damper-support rotatable upon the shaft, a thermally responsive member coiled about the shaft and fastened at its ends respectively to the shaft and to the damper support, and two dampers fastened to the damper support and respectively controlling the admission of draft-checking air through the said apertures and the gas-passage area of the flue-pipe.

4. An automatic regulator as per claim 3, in which the thermally responsive member is a flatwise coiled bimetallic strip in which the radially outer metal has a higher coefficient of expansion than the other metal; and in which the shaft is fastened to the end of the strip which is farthest from the said plate, whereby changes in the length of the coil due to a rise and fall of temperature will move the check-damper respectively away from and toward the said plate.

5. An automatic regulator as per claim 3, including means rotatable with respect to the shaft for varying the rotational position of the shaft with respect to the said plate, and releasable means normally latching the shaft against rotation with respect to the said plate.

6. An automatic regulator for controlling the operation of a heater connected to a flue-pipe which is provided with an opening for admitting draft-checking air, comprising a stationary plate spanning the said opening and provided with apertures, a shaft rigidly supported by the said plate and extending into the flue-pipe radially of the latter, a damper-supporting sleeve rotatable upon the shaft, a bimetallic coil coaxial with the shaft and fastened at its ends respectively to the shaft and to the said sleeve, a check-draft damper supported by and coaxial with the sleeve and controlling the said openings, and a flue-throttling damper comprising two segmental vanes extending substantially diametric of the flue-pipe.

7. An automatic regulator as per claim 6, including two vanes disposed at opposite sides of the said bimetallic coil and extending in a common plane diametric of the shaft, and means securing the said vanes to the check-draft damper, the said means being arranged to permit adjustment of the vanes circumferentially of the shaft.

8. An automatic regulator as per claim 6, including releasable means accessible from the exterior of the mechanism for latching the shaft against rotation with respect to the apertured stationary plate, and a knob on the outer end of the shaft for manually rotating the shaft when the said means are released.

9. An automatic regulator for controlling the flow of combustion gases through a flue-pipe which leads from a heater and which pipe has an opening for admitting draft-checking air, comprising a stationary plate spanning the said opening and provided with air-admitting apertures, a shaft normally non-rotatable with respect to the said plate and extending into the said pipe, a member rotatable and slidable upon the shaft and including a damper controlling the said apertures, and a thermally responsive element coiled freely about the shaft and fastened at its ends respectively to the shaft and the said member; the construction of the said element and the relative location of its said end fastenings being such that changes in the length of the coil due to variations in temperature cause the said coil to move the check-draft damper axially of the shaft in a direction away from the said plate with a rise in temperature and in the opposite direction with a decrease in temperature.

10. An automatic regulator as per claim 9, including means normally latching the said shaft to the said plate, the said means being releasable to permit a rotational change of the plate with respect to the shaft for adjusting the regulator.

11. An automatic regulator for controlling the flow of combustion gases through a flue-pipe which leads from a heater and which pipe has an opening for admitting draft-checking air, comprising a stationary plate spanning the said opening and provided with air-admitting apertures, a shaft normally non-rotatable with respect to the said plate and extending into the said pipe, a member rotatable and slidable upon the shaft and including a damper controlling the said apertures, and a thermally responsive element coiled freely about the shaft and fastened at its ends respectively to the shaft and the said member; and a cup-like metallic member freely housing the said element and sealed at its mouth end to the damper; the cup-bottom of the said member having a bore coaxial with the shaft, in which bore the inner end of the shaft is journaled with freedom for both rotational and sliding movement.

12. In a regulator for controlling a flue-pipe, a damper, a rotatable shaft extending radially into the flue-pipe and centrally of the damper, and two concentric bimetallic strips spiraled in the same direction around the shaft and each fast at its ends respectively to the shaft and to the damper, each strip having all except its end portions freely spaced from the other strip.

13. In a regulator for controlling a flue-pipe, a damper, a rotatable shaft extending radially into the flue-pipe and centrally of the damper, and two concentric bimetallic strips spiraled in the same direction around the shaft and each fast at its end respectively to the shaft and to the damper, each strip having all except its end portions freely spaced from the other strip; a metal tube freely housing the larger diametered bimetallic strip, the tube being substantially sealed at both ends, the tube being concentric with the two spiraled strips and spaced from the larger diametered strip by a distance which is a minor fraction of the radius of the bore of the inner spiraled strip.

14. In a regulator for controlling the admission of air through a lateral opening in a flue pipe, an apertured plate fastened to the flue pipe and extending across the said opening, a rotatable damper having vanes controlling the aperture in the said plate; a shaft, coaxial with the damper and extending into the flue-pipe; and a coil of bimetallic metal coaxial with the damper and fastened at its ends respectively to the said plate and the said shaft, whereby changes in the length of the said coil due to variations in the temperature of the coil will cause the coil to move the damper axially conjointly with the rotation of the damper by the said coil; the relative disposition of the aforesaid elements being such that the change in the length of the coil which causes the latter to move the damper to a complete aperture-closing position will also cause the coil to press the damper against the said plate.

15. A regulator for controlling the operation of a heater connected to a flue-pipe having a lateral opening, comprising: a normally stationary plate extending across the opening and provided with apertures for admitting air to the flue-pipe, a shaft extending through the said plate into the flue-pipe and rotatably fastened within the said plate, a sleeve journaled upon and slidable on the shaft, a bimetallic strip spiraled around the sleeve and fastened at its ends respectively to the sleeve and to the shaft, and an air damper fast upon the sleeve and controlling the said air-admitting apertures, all except the end portions of the said strip being freely spaced from the shaft.

16. A regulator as per claim 15, in which the damper and the apertured stationary plate have relatively interengageable portions disposed for limiting the rotation of the damper in each direction.

17. A regulator as per claim 15, including a second damper fast with respect to the air damper and disposed within the flue-pipe and rotatable in synchronism with said air damper for limiting the passage of combustion gases through the flue-pipe.

ARTHUR C. McWILLIAMS.